United States Patent
Meyer

(10) Patent No.: US 8,588,356 B2
(45) Date of Patent: Nov. 19, 2013

(54) METHOD AND DEVICE FOR DETECTING A PHASE ERROR OF A SIGNAL

(75) Inventor: Jacques Meyer, Saint-Martin-le-Vinoux (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 292 days.

(21) Appl. No.: 12/909,172

(22) Filed: Oct. 21, 2010

(65) Prior Publication Data

US 2011/0096876 A1 Apr. 28, 2011

(30) Foreign Application Priority Data

Oct. 22, 2009 (FR) ...................................... 09 05081

(51) Int. Cl.
*H04L 25/00* (2006.01)

(52) U.S. Cl.
USPC .......... 375/371; 375/226; 375/316; 375/346; 375/354; 375/373; 375/375; 375/376; 455/260; 455/296; 455/501; 455/502; 455/516; 370/335; 370/342; 370/503; 370/516; 327/141; 327/147; 327/156; 327/551; 329/360

(58) Field of Classification Search
USPC ......... 375/341, 226, 316, 346, 354, 371, 373, 375/375, 376; 455/260, 296, 501, 502, 516; 370/335, 342, 503, 516; 327/141, 147, 327/156, 551; 329/360
See application file for complete search history.

(56) References Cited

U.S. PATENT DOCUMENTS

| | | | | |
|---|---|---|---|---|
| 7,088,978 B2 * | 8/2006 | Hui et al. | ....................... | 455/296 |
| 7,263,139 B1 * | 8/2007 | Kingston et al. | ............... | 375/327 |
| 7,421,041 B2 * | 9/2008 | Khandekar et al. | ........... | 375/316 |
| 7,548,587 B2 * | 6/2009 | Zhang | ............................ | 375/260 |
| 2006/0291591 A1 * | 12/2006 | Ghosh | ............................ | 375/340 |
| 2010/0290512 A1 * | 11/2010 | Ghosh | ............................ | 375/224 |

OTHER PUBLICATIONS

By Anderson et al., "Theoretical Performance of Binary Coherent PSK on AM SCA Channels", Dec. 1983, IEEE Transaction on Broadcasting, vol. BC-29, No. 4, pp. 113-120.*
Divsalar et al., "Maximum-Likelihood Differential Detection of Uncoded and Trellis Coded Amplitude Phase Modulation over AWGN and Fading Channels-Metrics and Performance," *IEEE Transactions on Communications* 42(1):76-89, 1994.

(Continued)

Primary Examiner — Leon Flores
(74) Attorney, Agent, or Firm — Seed IP Law Group PLLC

(57) ABSTRACT

A method for receiving a signal having a succession of symbols, transmitted by a digital modulation, each symbol transmitted having a phase and an amplitude belonging to a set of values in finite number, the method includes evaluating a phase error (PHE) on a received symbol (S), resulting from a signal transmission noise, correcting the phase of the received symbol according to the phase error evaluated, demodulating the symbol corrected in phase, and modeling the transmission noise by a Gaussian component not correlated with the signal received and defined by a power and an interference component defined by an amplitude and which phase is substantially uniformly distributed, the phase error of the received symbol evaluated on the basis of the power of Gaussian component and the amplitude of the interference component.

31 Claims, 4 Drawing Sheets

(56) References Cited

OTHER PUBLICATIONS

Dong et al., "Iterative Phase Recovery Method of Turbo-Coded 16QAM Based on Soft Symbol to Bit Mapping," in *Proceedings of the 10th Asia-Pacific Conference on Communications and 5th International Symposium on Multi-Dimensional Mobile Communications*, Tsinghua University, Beijing, China, Aug. 29-Sep. 1, 2004, pp. 782-787.

Linn, "A Robust Phase Detection Structure for M-PSK: Theoretical Derivations, Simulation Results, and System Identification Analysis," in *Proceedings of the Canadian Conference on Electrical and Computer Engineering*, University of British Columbia, Vancouver, BC, May 1-4, 2005, pp. 869-883.

Mackenthun, "A Fast Algorithm for Maximum Likelihood Detection of QPSK or $\pi/4$-QPSK Sequences with Unknown Phase," in *Proceedings of the Third IEEE International Symposium on Personal, Indoor, and Mobile Radio Communications*, Boston, MA, Oct. 19-21, 1992, pp. 240-244.

Noels et al., "Performance Analysis of ML-Based Feedback Carrier Phase Synchronizers for Coded Signals," *IEEE Transactions on Signal Processing* 55(3):1129-1136, 2007.

* cited by examiner

METHOD AND DEVICE FOR DETECTING A PHASE ERROR OF A SIGNAL

BACKGROUND

1. Technical Field

The present disclosure relates to a method and a device for detecting a phase error of a received signal, and, in particular, to the reception of a signal digitally modulated by phase and possibly amplitude shifted.

2. Description of the Related Art

Most digital demodulators utilize a phase detection device allowing a reference carrier signal locally generated by the receiver to be aligned with the phase of the transmitter of these signals. Now, from the transmission thereof, a signal transmitted is subjected to various frequency translations generating a phase noise which may be relatively significant. The phase noise generally includes high frequency components and low frequency components. The low frequency components of the phase noise may be compensated by evaluating a phase error from a number of successive symbols resulting from the sampling of the received signal, corrected at least partially directly or in a phase-lock loop PLL.

If the symbols transmitted are not known in advance i.e., in the absence of pilot symbols, there is no simple means for evaluating a phase error or the phase of the received signal. However, in a phase-lock loop, a magnitude is evaluated to cancel the average value of the phase error. The magnitude may be evaluated symbol by symbol in the phase-lock loop, at least when the phase error to be evaluated is low, so as to guarantee a convergence of the loop. In practice, this magnitude consists of a periodic and odd function of the phase error and a measure noise that depends on the noise of the signal, approximations of the magnitude estimator and especially on the fact that the value of the symbols is unknown. That is why, generally, it is not desired to evaluate the absolute phase of the symbol transmitted (for example in QPSK, the error measures are modulo $\pi/2$).

Conventionally, the phase error PHE on a received symbol may be evaluated on the basis of the following formula:

$$PHE(S) = \Im m(S \cdot \hat{S}^*) \qquad (1)$$

where $\Im m(X)$ is a function giving the imaginary part of a complex number X, S represents the complex value of the received symbol and $\hat{S}^*$ represents the complex conjugate value of an estimation of the symbol S. When the symbols are transmitted by a digital phase modulation having a simple constellation, such as QPSK (S=I+jQ where I and Q are equal to + or −1), the formula (1) simplifies as follows:

$$PHE(S) = Q \cdot sign(I) - I \cdot sign(Q) \qquad (2)$$

where sign(x) is a function equal to +1 or −1 according to the sign of the variable x.

However, the simplified formula (2) becomes ineffective if a relatively significant noise causes decision errors regarding the value of the received symbol. Thus, in the case of a QPSK modulation, if the received symbol has an imaginary part Q near 0, the phase error detected has a sign that has a 50% chance of being erroneous. In addition, the signal to be processed may be disturbed by interferences caused by a simple constant frequency carrier or by a signal having a lower power, transmitted in a same transmission channel as the signal to be processed. Such interferences may cause the phase-lock loop to diverge, even in the absence of any other noise.

According to the theory for evaluating a parameter with a maximum of likelihood, optimum phase detection in an operation of receiving symbols may be modeled as follows:

$$OPD(S) = \frac{\partial}{\partial \theta} Ln(Pr(S \mid \theta))]_{\theta=0} \qquad (3)$$

where $Pr(S|\theta)$ is the probability that the symbol S has a phase equal to $\theta$, Ln is the Napierian logarithm function and $$\frac{\partial}{\partial \theta} X]_{\theta=0}$$

is the derivative of X in relation to $\theta$ near $\theta=0$. In the formula (3), it appears that the function OPD( ) may be entirely determined if the noise distribution affecting the symbol in the complex plane is known.

Generally, phase detections are performed from approximations of the formula (3) based on a modeling of the average noise distribution. According to this evaluation and modeling complexity, the result is a more or less simple detection function. In some cases, the detection function is performed using look-up tables LUT depending on noise, addressed by the components I and Q of the received symbol. These tables are stored in a memory of a ROM or a RAM type if the values of the tables must be recalculated to take into account the evolution of noise distribution. Currently, the best phase detections use look-up tables that usually have 16 000 values, even using a rotational symmetry appearing in the noise distribution in the complex plane. The implementation of such tables therefore requires a not negligible calculation and loading time, and a relatively significant space in memory.

In the case of a noise caused by interference with a signal near in frequency, the interference noise alternately passes between a state in phase and a state out of phase with the received signal. The result is that the look-up table must be frequently recalculated, which may be impossible for current symbol rates, around 20 to 30 MBauds. It may then be considered to determine a compromise supplying a result acceptable for any case.

BRIEF SUMMARY

It is therefore desirable to be able to calculate under certain conditions an optimal phase error value, implementing a look-up table of substantially small size in relation to the look-up tables commonly used in phase detectors.

One embodiment relates to a method for receiving a signal including a succession of symbols, transmitted by a digital modulation, each symbol transmitted having a phase and an amplitude belonging to a set of values in finite number, the method including evaluating a phase error on a received symbol, resulting from a signal transmission noise, correcting the phase of the received symbol according to the phase error evaluated, and demodulating the symbol corrected in phase. According to one embodiment, the method includes modeling the transmission noise by a Gaussian component not correlated with the received signal, defined by a power and an interference component defined by an amplitude and which phase is substantially uniformly distributed, the phase error of the received symbol being evaluated on the basis of the power of the Gaussian component and the amplitude of the interference component.

According to one embodiment, the method includes evaluating average values of the power of the Gaussian component and the amplitude of the interference component of the noise on a certain number of received symbols.

According to one embodiment, the phase error of the received symbol is evaluated by a maximum likelihood calculation algorithm based on a phase derivative calculation of a sum of logarithms of probabilities that the phase of the received symbol is equal to each of the values of the finite set of phases of the modulation.

According to one embodiment, the phase error of the received symbol is evaluated using the following equation:

$$PHE(S) = \frac{\sum_{i=1}^{m}(I \cdot bk - Q \cdot ak) \cdot LUT1[rk]}{\sum_{i=1}^{m} LUT0[rk]}$$

where I and Q are the real and imaginary parts of the received symbol, ak and bk are the real and imaginary parts of a point of the modulation constellation including m points, rk is the distance in the complex plane between a position of the received symbol and the point of the constellation, and LUT0[rk] and LUT1[rk] are look-up tables, the table LUT0[rk] including values approximating a function of probability that a value of distance rk is equal to the distance between the position of the received symbol and the point of the constellation, in the direction of a straight line passing by the position of the symbol S and the point Pk, and the table LUT[rk] including values approximating the derivative function of the probability function approximated by the table LUT0[rk], divided by the distance r, to a proportionality factor.

According to one embodiment, the method includes evaluating the power of the Gaussian component and the amplitude of the interference component of the noise, from a sequence of several hundreds of received symbols, and evaluating values included in the look-up tables according to the evaluated power of the Gaussian component and amplitude of the interference component of the noise.

According to one embodiment, the values of the look-up tables LUT0[r] and LUT1[r] are evaluated to a proportionality factor using the following equations:

$$LUT0[r] = I0(u) \cdot \exp(v) \text{ and}$$

$$LUT1[r] = \frac{1}{\sigma^2}\left[1 - \frac{R^2}{2\sigma^2} \cdot T(u)\right] \cdot LUT0[r]$$

where $$u = \frac{r \cdot R}{\sigma^2}, v = -\frac{r^2 + R^2}{2\sigma^2},$$

I0 is a modified first order Bessel function, $2\sigma^2$ is the power of the Gaussian component of the noise, $$T(u) = \frac{2}{u} \cdot \frac{I1(u)}{I0(u)}$$

and I1 is the derived function in relation to u of the function I0.

According to one embodiment, the method provides for evaluating the power of the Gaussian component $2\sigma^2$ and the amplitude R of the interference component of the noise, using the following equations:

$$R^2 = \langle B0 \rangle - \langle B1 \rangle \text{ and } 2\sigma^2 = \langle B1 \rangle$$

where $\langle \ \rangle$ is the averaging operator on a sequence of several received symbols, $$B0 = \frac{\sum_{k=1}^{m} rk^2 LUT0[rk]}{\sum_{k=1}^{m} LUT0[rk]} \text{ and } B1 = \frac{\sum_{k=1}^{m} rk^2 LUT1[rk]}{\sum_{k=1}^{m} LUT0[rk]}.$$

According to one embodiment, the method involves correcting a value of each received symbol obtained by demodulating the received symbol, correcting using a look-up table used to evaluate a phase error on a received symbol, and including values approximating a function of probability that a value is equal to the distance between the position of the received symbol and a point of the modulation constellation.

One embodiment also relates to a device for receiving a signal having a succession of symbols, transmitted by a digital modulation, each symbol transmitted having a phase and amplitude belonging to a set of values in finite number. According to one embodiment, the device includes a phase error evaluation circuit implementing the method previously defined.

According to one embodiment, the phase error evaluation circuit has an access to a first look-up table including values approximating a function of probability that a distance value is equal to the distance between the position of the received symbol and a point of a constellation of the digital phase modulation, and an access to a second look-up table including values approximating the derived probability function approximated by the first look-up table.

According to one embodiment, the phase error evaluation circuit includes accumulators combined to adders and switches for calculating a first sum of values read in the first look-up table and calculating a second sum of values read in the second look-up table weighted by a weight factor, the values read in the look-up tables being obtained according to distances between the position of the received symbol and each point of a constellation of the digital phase modulation, and calculation means for calculating a phase error obtained by dividing the second weighted sum by the first sum.

According to one embodiment, the phase error evaluation circuit utilizes a calculation circuit for each point of a constellation of the digital phase modulation, each calculation circuit being configured to determine a value read in the first look-up table and a value read in the second look-up table, according to a distance between the position of the received symbol and a point of a constellation of the digital phase modulation, and to multiply the value read in the second look-up table by a weight factor depending on values of the received symbol and the point of the constellation, the phase error evaluation circuit including a first adder for calculating the sum of the values read in the first look-up table, and a second adder for calculating the weighted sum of the values read in the second look-up table.

According to one embodiment, the phase error evaluation circuit has a circuit for calculating two quantities using the values read in the look-up tables, and a calculation circuit for calculating average values of the two quantities on a sequence of several hundreds of received symbols, evaluating the power of the Gaussian component and the amplitude of the interference component, and calculating and updating the values of the look-up tables.

According to one embodiment, the device includes a demodulator for demodulating the symbols corrected in phase from the phase error evaluated by the phase error evaluation circuit, the demodulator receiving the values read in the first look-up table to correct the value of the demodulated symbols.

Another embodiment relates to a system for transmitting by a digital modulation a signal including a succession of symbols, each symbol transmitted having a phase and amplitude belonging to a set of values in finite number. According to one embodiment, the system includes the reception device previously defined, for receiving the signal transmitted.

In accordance with another aspect of the present disclosure, a method and device for detecting the phase error of a received signal digitally modulated by phase and possibly by amplitude is provided. Such a modulation may be of the type m-PSK (m-states Phase-Shift Keying) or m-APSK (m-states Amplitude and Phase Shift Keying), which consists in giving to a carrier a phase and/or an amplitude, and which may take a finite number of values, depending on the value of the signal to be transmitted. The phase and amplitude values given by the modulator forming in the complex plane a so-called constellation of a finite number of points. The standard DVB-S2 (Digital Video Broadcasting-Satellite 2nd generation), which may be applied to the transmission by satellite of one or more audio or video flows MPEG-2 or MPEG-4, recommends using the modulations QPSK (Quadrature Phase-Shift Keying), 8-PSK, 16-APSK or 32-APSK.

The present disclosure also relates to all the complex modulations of a carrier, i.e., particularly to the modulations m-QAM (Quadrature Amplitude Modulation) and m-PSK used for example in the standards DVB-S, DVB-C, and DOCSIS.

In accordance with another aspect of the present disclosure, a circuit is provided that includes a phase error evaluation circuit adapted to receive transmitted digitally modulated symbols having amplitude and phase belonging to a set of values in finite number, the phase error evaluation circuit including at least two accumulators combined to respective at least two adders and switches and adapted to be coupled to first and second look-up tables and to calculate a first sum of values read in the first look-up table and a second sum of values read in the second look-up table weighted by a weight factor; a calculation circuit for each point of a constellation of a digital phase modulation of the received symbol, each calculation circuit configured to determine a value read from the first look-up table and a value read from the second look-up table according to a distance between the position of the received symbol and the point of the constellation of the digital phase modulation, and to multiply the value read in the second look-up table by the weight factor; a first adder adapted to calculate the sum of the values read in the first look-up table, and a second adder adapted to calculate the weighted sum of the values read in the second look-up table; and a circuit adapted to calculate two quantities using the values read in the first and second look-up tables and an average value calculation circuit to calculate average values of the two quantities on a sequence of a plurality of received signals and to evaluate a power of a Gaussian component and amplitude of an interference component, and to calculate and update the values of the first and second look-up tables.

In accordance with another aspect of the foregoing embodiment of the present disclosure, the circuit includes a demodulator to demodulate the received symbols corrected in phase from the phase error evaluation circuit, the demodulator receiving the values read in the first look-up table and to correct the value of the demodulated symbols.

In accordance with another aspect of the foregoing embodiment of the present disclosure, the phase error evaluation circuit is adapted to model transmission noise of the received symbols by a Gaussian component not correlated with the received symbols, defined by a power and an interference component having an amplitude and a phase that is substantially uniformly distributed, the phase error of the received symbols evaluated on the basis of the power of the Gaussian component and on the basis of the amplitude of the interference component.

BRIEF DESCRIPTION OF THE SEVERAL VIEWS OF THE DRAWINGS

Embodiments of the disclosure will be described hereinafter, in relation with, but not limited to, the appended figures wherein.

DETAILED DESCRIPTION

Figure 1:
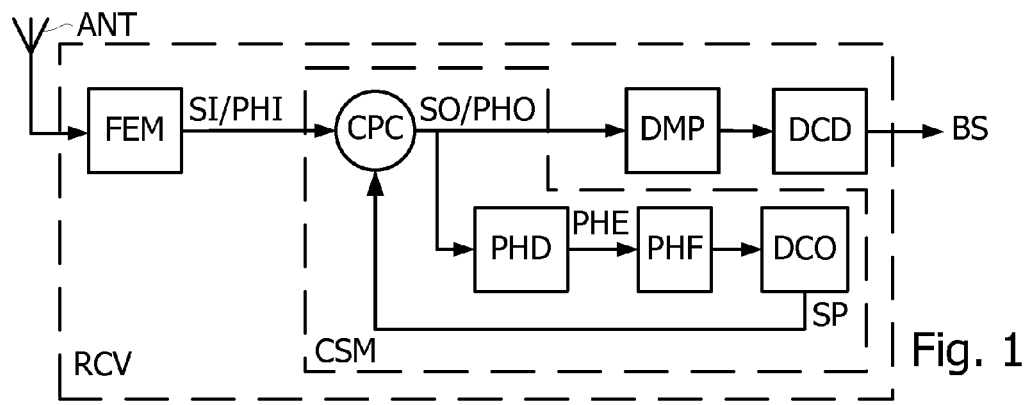
FIG. 1 schematically shows a receiver of digital signals.

FIG. 1 shows a receiver of digital signals modulated in phase. In FIG. 1, the receiver RCV includes an input module FEM, a carrier synchronization module CSM, a demodulation module (or demapper) DMP, and an error correction module DCD. The module FEM is connected to a reception antenna ANT for receiving digital signals. The module FEM converts the received signal in baseband, and samples the baseband signal in a succession of symbols SI, each including a real component and an imaginary component, corresponding to an input phase PHI. The module FEM provides the module CSM with the symbols SI obtained.

It is to be understood while the present disclosure is described in the context of radio frequency transmission and reception using radio frequency transmitters and receivers, particularly with respect to digital processing of transmitted and received signals, the present disclosure is applicable to communications via cable and optical media. Moreover, the present disclosure can be adapted for use in both hardware, software, and firmware as known to those skilled in the art. Thus, these components will not be described herein in detail. One of skill would be able to readily adapt the present disclosure for implementation in a computer processor, including a microprocessor, as well as analog and digitally transmitted and received signals for use in voice and video communications that are audibly received or visually received or a combination of audio/visual reception by a user on known display devices, such as display screens, speakers, and the like.

The module CSM includes a phase correction module CPC receiving the symbols SI of the module FEM. The module CPC supplies for each received symbol SI a symbol SO, which phase PHO is corrected taking into account a phase error. To that end, the module CPC also receives a phase correction signal SP. The module CSM includes a phase error evaluation circuit PHD determining an instantaneous phase error PHE on each symbol SO. The phase error PHE is filtered by a filter PHF, and supplied to the input of a digitally controlled oscillator DCO. The oscillator DCO provides the module CPC with the phase correction signal SP which phase is the filtered phase error.

The module DMP performs demodulating of the symbols SO corrected in phase supplied by the module CSM by converting each received symbol into a digital code. The module DCD converts using an error correction algorithm each symbol code and supplies a binary flow BS corresponding to the information transmitted.

In the following description, the phase error evaluation circuits are based on a transmission noise modeling including a Gaussian noise component or Gaussian component, and an interference component causing interferences with the received signal. The Gaussian component, which may for example be a Gaussian noise, has a phase with a substantially uniform distribution and not correlated with the received symbols. The Gaussian component may therefore entirely be characterized by a radial distribution (symmetrical with respect to the origin of the complex plane), defined by a value of variance or power $2\sigma^2$ ($\sigma^2$ being the variance or power of each real and imaginary part of the Gaussian component). The interference component is a signal with a fixed frequency near that of the signal to be processed, which may have been subjected to a modulation of n-PSK type, which symbols are in phase with the sampling of the received signal, and with a random phase in relation to the phase of the carrier of the received signal. The interference component is therefore entirely defined by the amplitude R thereof.

Figure 2:
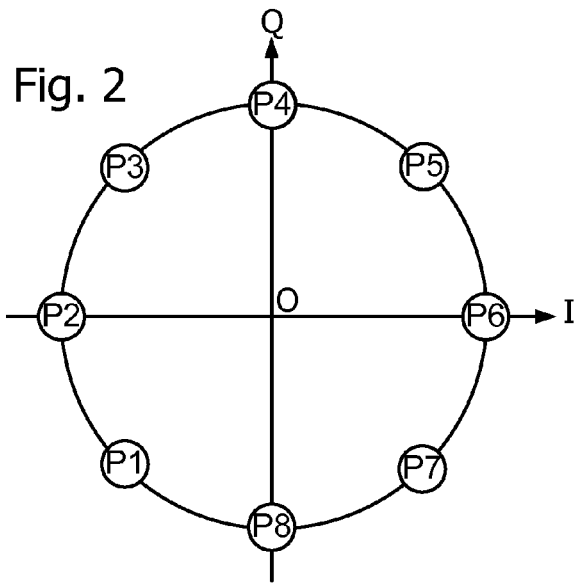
FIG. 2 shows an example of a constellation of points of a digital modulation.

The signal transmitted is modulated by a digital modulation having an N-point constellation. FIG. 2 shows an example of constellation of points of a digital modulation. FIG. 2 particularly shows the constellation of points of a modulation of 8-PSK type having points P1 to P8 distributed on a circle centered on the origin O of the complex plane.

Figure 3:
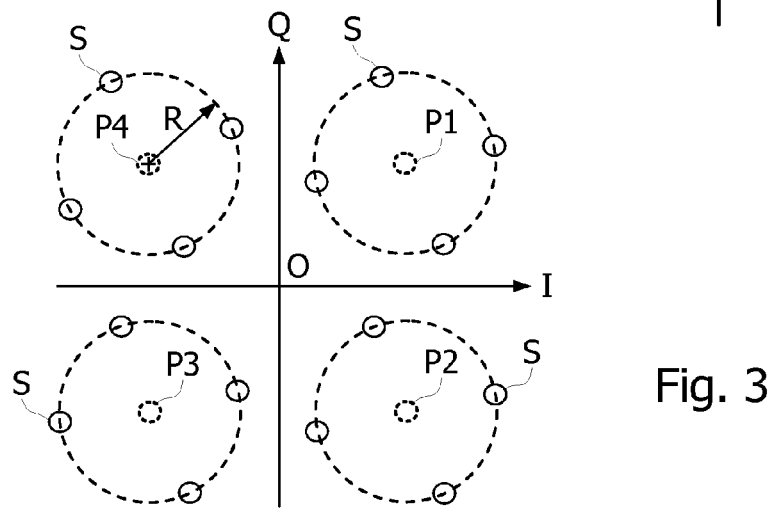
FIG. 3 shows another example of a constellation of points of a digital modulation showing received symbols, FIG. 4 schematically shows a circuit for evaluating phase error in a received signal according to one embodiment, FIG. 5 schematically shows a circuit for evaluating phase error in a received signal according to another embodiment.

FIG. 3 shows another example of a constellation of points of a digital modulation of QPSK type. This constellation includes four points P1, P2, P3, P4, located at equal distances from the origin O of the complex plane and corresponding to phases equal to + and $-\pi/4$, and + and $-3\pi/4$. FIG. 3 shows the case where the transmission of symbols is subjected to an interference noise component of amplitude R, in phase with the sampling of the received signal in symbols. The received symbols S may then be located on circles which radius is equal to the amplitude R of the interference component, centered on the points P1 to P4 of the constellation. If the symbols of the interference component are not in phase with the sampling of the received signal, the received symbols are located in clouds of points centered on the points P1 to P4. In this situation, the interference component may be approximated by an interference component of lower amplitude and an additional Gaussian noise component which power adds to that of the Gaussian component.

In the case where a received symbol S corresponds to an unknown emitted symbol S and has a phase error $\theta$, the optimal calculation of the phase error may be performed using the following equation:

$$PHE(S) = \frac{\sum_{k=1}^{m} \frac{\partial}{\partial \theta} Pr(S \mid \theta, Se = Pk) \cdot Pr(Se = Pk) \Big|_{\theta=0}}{\sum_{k=1}^{m} Pr(S \mid \theta, Se = Pk) \cdot Pr(Se = Pk) \Big|_{\theta=0}} \quad (4)$$

where $Pr(S|\theta,Se=Pk)$ is the probability that the symbol S is transmitted with the phase error $\theta$ and corresponds to the emitted symbol Se equal to one of the points Pk of the constellation of a digital modulation having a m-point constellation, and $Pr(Se=Pk)$ is the probability that the emitted symbol Se is equal to the point Pk. In most cases, the emitted symbols have the same probability. The result is that the previous formula simplifies as follows:

$$PHE(S) = \frac{\sum_{k=1}^{m} \frac{\partial}{\partial \theta} Pr(S \mid \theta, Se = Pk) \Big|_{\theta=0}}{\sum_{k=1}^{m} Pr(S \mid 0, Se = Pk)} \quad (5)$$

When the noise is Gaussian, the probability of receiving a symbol S when a symbol P is transmitted only depends on the distance between the symbols S and P in the complex plane. Now in the complex plane where the modulation constellation is centered on the point of origin O, the distance R between the symbols P and S may be expressed by the following equation:

$$r^2 = PS^2 = OP^2 + OS^2 - 2OP \cdot OS \cos(\phi - \alpha - \theta) \quad (6)$$

where $\phi$ is the argument of S, $\alpha$ is the argument of P and $\theta$ is the phase error. By deriving the previous expression in relation to the phase error $\theta$, the following relation is obtained:

$$r \frac{\partial r}{\partial \theta} = OP \cdot OS \cdot \sin(\varphi - \alpha - \theta) \quad (7)$$

The result is the following relation between the derivative of the logarithm of the probability Pr(r) in relation to the phase error $\theta$ and the derivative of the same logarithm in relation to r:

$$\frac{\partial}{\partial \theta}[\mathrm{Ln}(Pr(r))]\Big|_{\theta=0} = \quad (8)$$

$$\frac{\frac{\partial}{\partial r} Pr(r)}{Pr(r)} \frac{\partial (r)}{\partial \theta}\Big|_{\theta=0} = \frac{OP \cdot OS \cdot \sin(\varphi - \alpha)}{r} \cdot \frac{\frac{\partial}{\partial r} Pr(r)}{Pr(r)}$$

If $a = OP \cdot \cos \alpha$, $b = OP \cdot \sin \alpha$, $I = OS \cdot \cos \phi$ and $Q = OS \cdot \sin \phi$ are put down (where a and b are the Cartesian coordinates of the point P in the complex plane and I and Q are the Cartesian coordinates of the point S in this plane), the result is:

$$\frac{\partial}{\partial \theta} \mathrm{Ln}(Pr(r))\Big|_{\theta=0} = \frac{(Q \cdot a - I \cdot b)}{r} \cdot \frac{\partial}{\partial r} \mathrm{Ln}(Pr(r)) \quad (9)$$

If the functions Ln(Pr(r)) and $$\frac{1}{r} \cdot \frac{\partial}{\partial r} Pr(r)$$

are approximated by the look-up tables LUT0 and LUT1, the result is:

$$PHE(S) = \frac{\sum_{i=1}^{m}(I \cdot bk - Q \cdot ak) \cdot LUT1[rk]}{\sum_{i=1}^{m} LUT0[rk]} \quad (10)$$

Here, it is to be noted that the tables LUT0 and LUT1 may be defined with an independent arbitrary proportional coefficient of r, this coefficient only acting on the phase-lock loop PLL (FIG. 1). The values of the tables LUT0 and LUT1 may be determined by learning on a sequence of known symbols.

According to another embodiment, the content of the tables may be determined as follows. Given the noise modeling previously described, when a symbol P is transmitted, it is received with a Gaussian noise component of power $2\sigma^2$ and an interference noise component equal to $R \cdot \exp(j\gamma)$, where $\gamma$ is the component argument. The probability of receiving a symbol S for an emitted symbol P may therefore be expressed as follows:

$$Pr(S \mid P, \gamma) = \frac{1}{2\pi.\sigma^2} \exp\left(-\frac{|S - P - R \cdot \exp(j\gamma)|^2}{2\sigma^2}\right) \quad (11)$$

Since the argument $\gamma$ of the interference component is unknown, but is assumed to be uniform, the probability $Pr(S|P,\gamma)$ may be integrated on all the possible values of $\gamma$, weighted by its density of probability equal to $1/2\pi$. The result is that:

$$Pr(S \mid P) = \frac{1}{2\pi} \int_0^{2\pi} \frac{1}{2\pi\sigma^2} \cdot \exp\left(-\frac{1}{2\sigma^2} \cdot |S - P - R \cdot \exp(j\gamma)|^2\right) \cdot d\gamma \quad (12)$$

If $|S-P|=r$ is put down, the result is:

$$Pr(S \mid P) = \frac{1}{2\pi} \int_0^{2\pi} \frac{1}{2\pi\sigma^2} \exp\left(-\frac{1}{2\sigma^2} \cdot (r^2 + R^2 - 2R \cdot r \cdot \cos(\gamma))\right) \cdot d\gamma \quad (13)$$

Now the function $$I0(x) = \frac{1}{2\pi} \int_0^{2\pi} \exp(x \cdot \sin(\gamma)) \cdot d\gamma$$

is a first order modified Bessel function. The result is that:

$$Pr(S \mid P) = Pr(r) = \frac{1}{2\pi\sigma^2} \cdot I0(u) \cdot \exp(v) \quad (14)$$

and $$\frac{\partial Pr(r)}{\partial r} = \frac{1}{2\pi\sigma^2}\left(\frac{R}{\sigma^2} I1(u) - \frac{r}{\sigma^2} I0(u)\right) \cdot \exp(v) \quad (15)$$

where $$u = \frac{r \cdot R}{\sigma^2}, \quad v = -\frac{r^2 + R^2}{2\sigma^2}$$

and $I1(u)$ is a first order modified Bessel function obtained by derivation of the function $I0(u)$ in relation to u. The phase error may then be deduced from the relations (5), (9), (14) and (15), as follows:

$$PHE(S) = \frac{\sum_k \left[(I \cdot bk - Q \cdot ak) \cdot \frac{1}{\sigma^2} \cdot \left(I0(uk) - \frac{R}{rk} \cdot I1(uk)\right) \cdot \exp(vk)\right]}{\sum_k [I0(uk) \cdot \exp(vk)]} \quad (16)$$

where $$uk = \frac{rk \cdot R}{\sigma^2}, \quad vk = -\frac{rk^2 + R^2}{2\sigma^2}$$

and the sum $\sum_k$ applies to all the points of the modulation constellation used to transmit the received signal.

The result is that the values of the tables LUT0 and LUT1 of the formula (10) may be calculated as follows:

$$LUT0[r] = I0(u) \cdot \exp(v) \quad (17)$$

$$LUT1[r] = \frac{1}{\sigma^2}\left[1 - \frac{R^2}{2\sigma^2} \cdot T(u)\right] \cdot LUT0[r] \quad (18)$$

where $$u = \frac{r \cdot R}{\sigma^2}, \quad v = -\frac{r^2 + R^2}{2\sigma^2} \text{ and } T(u) = \frac{2}{u} \cdot \frac{I1(u)}{I0(u)}.$$

The table LUT0 thus includes for each value r a set of possible distance values, a value proportional to the function Pr of probability that this value r corresponds to the distance between the position of the received symbol S and a considered point P of the constellation in the direction of a straight line passing by the points S and P. The table LUT1 includes values approximating the function derived from the probability function approximated by the table LUT0[r], divided by the distance r, to a proportionality factor.

Figure 4:
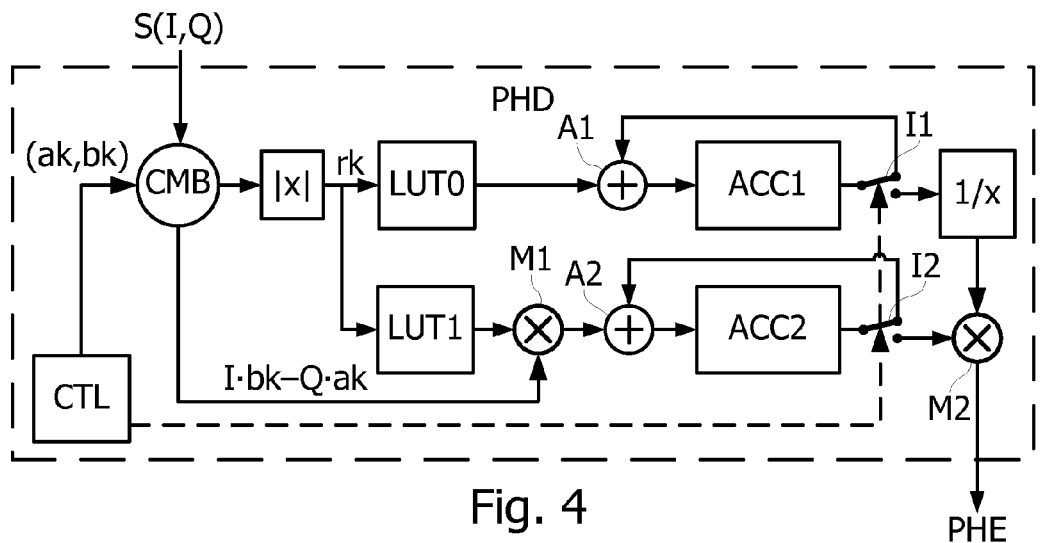

FIG. 4 shows an embodiment of the circuit PHD for evaluating the phase error of a signal modulated in m-PSK (m-states Phase-Shift Keying) or m-APSK (m-states Amplitude and Phase Shift Keying). The signal received is previously sampled in a succession of symbols S(I,Q) which may each correspond to an emitted symbol corresponding to a point of a constellation of modulation with m points P1, P2, ..., Pm of Cartesian coordinates in the complex plane (a1, b1), (a2, b2), ... (am, bm). The circuit PHD thus calculates the phase error PHE of a received symbol S(I,Q) by applying the formula (10). To that end, the circuit PHD includes a combination module CMB combining in different ways the real I and imaginary Q components of the received symbol S with the real ak and imaginary bk components of a point Pk of the constellation. The circuit PHD includes a module |x| for calculating a distance rk between the received symbol S and the point Pk of the constellation in the complex plane. The module |x| receives from the module CMB for example the values x=I−ak and y=Q−bk and calculates the distance rk using the following formula:

$$rk = \sqrt{x^2 + y^2} \quad (19)$$

The module |x| may be approximated by a linear function by interval.

The distance rk supplied by the module is used to address two look-up tables LUT0 and LUT1 which respectively supply values LUT0[rk] and LUT1[rk]. The value LUT0[rk] is applied to an adder A1. The module CMB also supplies the quantity (I·bk−Q·ak) to a multiplier M1 which also receives the value LUT1[rk]. The multiplier M1 supplies the quantity (I·bk−Q·ak)·LUT1(rk) to an adder A2. The outputs of the adders A1, A2 are connected to accumulators ACC1, ACC2, each for example including a register. The output of each accumulator ACC1, ACC2 is connected to a switch I1, I2. The switch I1 allows the output of the accumulator ACC1 to be directed at an input of the adder A1, or at an inverter 1/x. The switch I2 allows the output of the accumulator ACC2 to be directed at an input of the adder A2, or at a multiplier M2. The inverter 1/x may implement a look-up table between values of x belonging to an interval and inverted values of x 1/x, only a narrow interval being necessary if a floating point representation is used.

The circuit PHD also includes a control module CTL which successively supplies the Cartesian coordinates (ak, bk) of all the points Pk of the modulation constellation to the module CMB, and controls the switches I1, I2, to reloop the output of the accumulators ACC1, ACC2 onto the adders A1, A2. When the coordinates (ak,bk) of all the points Pk of the modulation constellation have been transmitted to the module CMB, the module CTL controls the switches I1, I2 to supply the values accumulated in the accumulators ACC1, ACC2 to the inverter 1/x and the multiplier M2. The output of the inverter 1/x is connected to an input of the multiplier M2, which outputs a phase error value PHE for each received symbol S.

The tables LUT0 and LUT1 typically include 50 to 100 values on the whole useful band, which depends on the noise distribution in the complex plane. For the constellations having a great number of points (8, 16 and 32), the sums may be limited to the points of the constellation (for example 4) located the nearest to the received symbol S.

It is to be noted that the circuit PHD is adapted if the sums $$\sum_k (I \cdot bk - Q \cdot ak) \cdot LUT1(rk) \text{ and } \sum_k LUT0(rk)$$

supplied by the accumulators ACC1, ACC2 associated with the adders A1, A2, may be calculated in a time inferior to the sampling period of the received signal in symbols.

Figure 5:
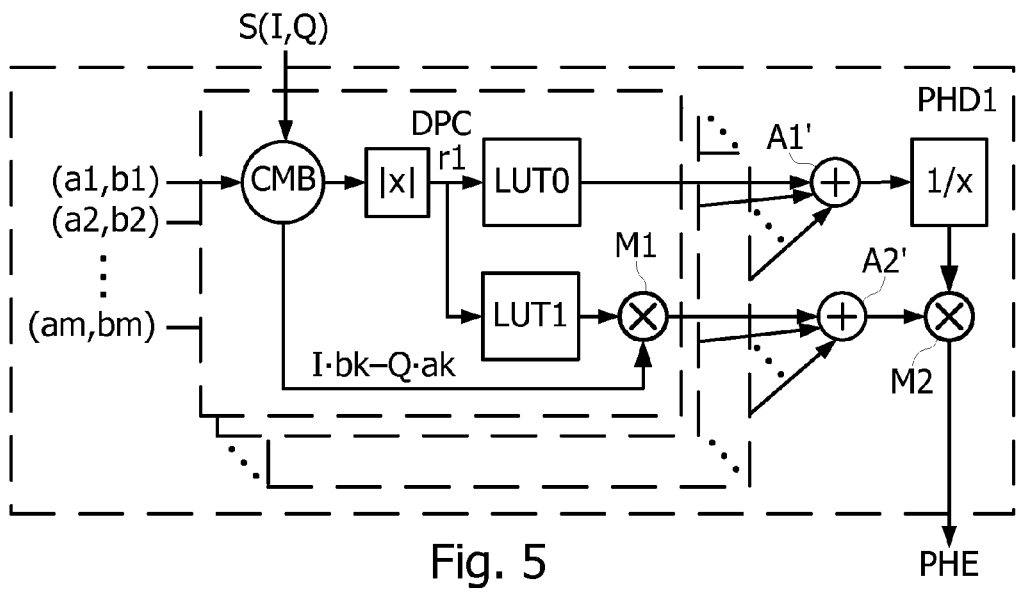

On the contrary, it may be considered to calculate in parallel the terms of these sums. Thus, FIG. 5 shows a phase error evaluation circuit PHD1 according to another embodiment. In FIG. 5, the elements already present in FIG. 4 bear the same reference signs. The phase error evaluation circuit PHD1 differs from the circuit PHD in that it includes a calculation module DPC for each term of these two sums, i.e., for each point Pk of the modulation constellation of the signal to be received, two adders A1', A2', the inverter 1/x including an input connected to the output of the adder A1', and the multiplier M2 including an input connected to the output of the inverter 1/x and the output of the adder A2'.

Each module DPC includes the combination modules CMB and |x|, an access to the tables LUT0 and LUT1 and the multiplier M1. The module CMB of each module DPC receives the value of the symbol S(I,Q) and the Cartesian coordinates (a1,b1), (a2,b2), ... (am,bm) of a respective point P1, P2, ... Pm of the m points of the modulation constellation. The output of the table LUT0 of each module DPC is connected to an input of the adder A1'. Likewise, the output of the multiplier M1 of each module DPC is connected to an input of the adder A2'. The output of the multiplier M2 supplies a phase error value PHE for the received symbol S.

Figure 6:
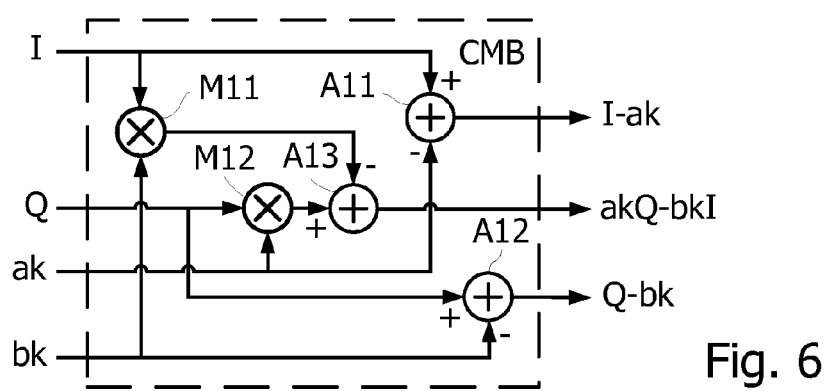
FIG. 6 shows a module of the error evaluation circuit of FIG. 2 or 3, FIG. 7 schematically shows a circuit for evaluating phase error in a received signal according to another embodiment, and FIG. 8 schematically shows a circuit for evaluating phase error in a received signal according to another embodiment.

FIG. 6 shows an embodiment of the module CMB shown in FIG. 4 or 5. The module CMB includes multipliers M11, M12 and adders A11, A12, A13. The multiplier M11 receives the real part I of the symbol S and the imaginary part bk of the point Pk. The adder A11 subtracts the real part ak of the point Pk from the real part I and therefore supplies the quantity (I−ak). The adder A12 subtracts the imaginary part bk from the imaginary part Q of the symbol S and therefore supplies the quantity (Q−bk). The multiplier M12 receives the imaginary part Q and the real part ak. The output of the multiplier M12 is subtracted from the output of the multiplier M11 in the adder A13 which therefore supplies the quantity (I bk−Q·ak).

Figure 7:
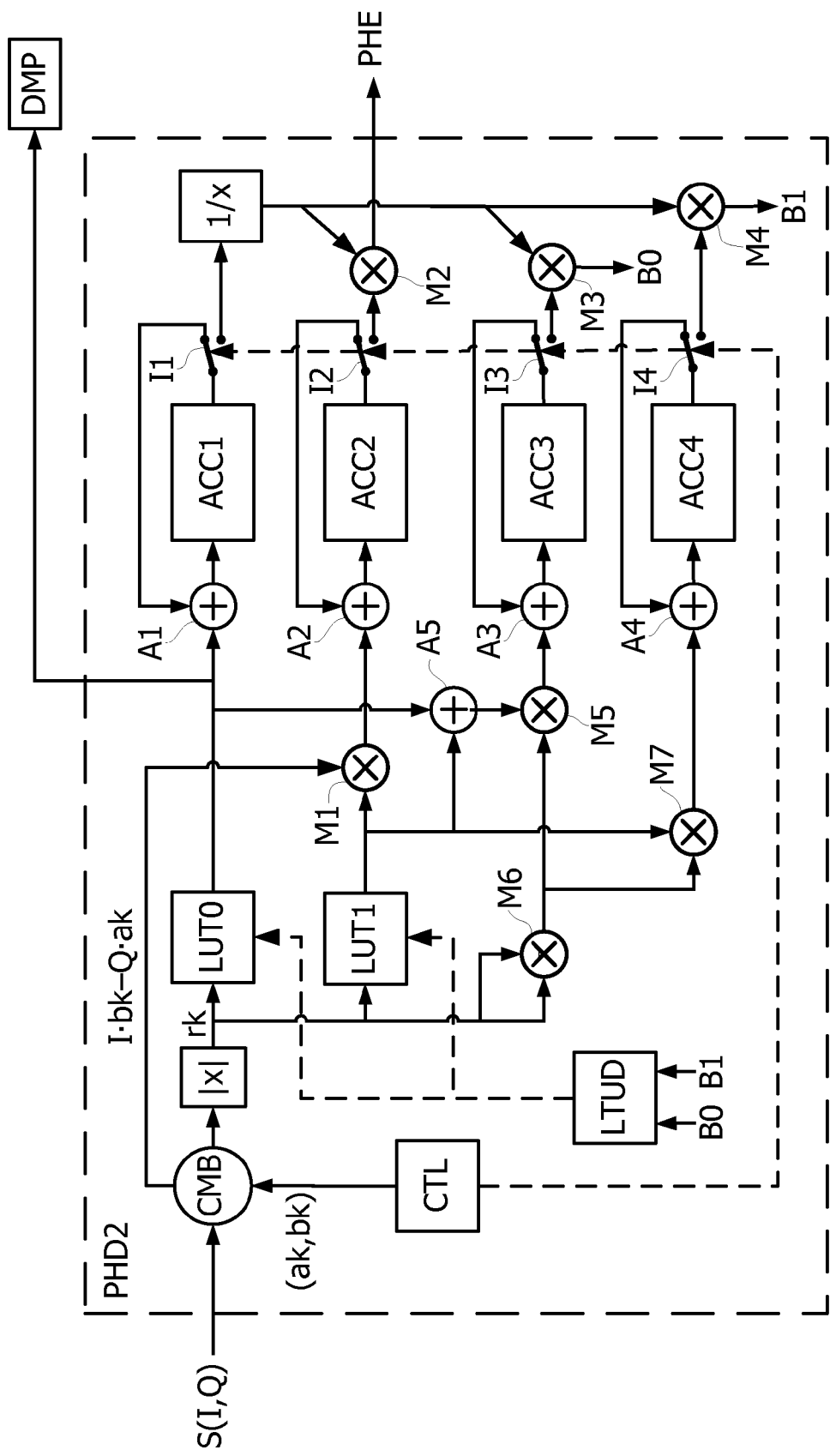

FIG. 7 shows a phase error evaluation circuit according to another embodiment. The elements of FIG. 7 which are identical to those of FIG. 4 bear the same reference signs. In FIG. 7, the phase error evaluation circuit PHD2 differs from that of FIG. 4 in that it includes circuits allowing the noise modeling parameters $R^2$ and $2\sigma^2$ for the symbol S(I,Q) to be evaluated. These circuits include multipliers M3 to M7, adders A3 to A5, two accumulators ACC3, ACC4, and two switches I3, I4. The outputs of the tables LUT0 and LUT1 are connected to the inputs of the adder A5 an output of which is connected to an input of the multiplier M5. The output of the module |x| is connected to the two inputs of the multiplier M6 the output of which is connected to an input of the multipliers M5 and M7. The output of the multiplier M5 is connected to the input of the adder A3. The output of the multiplier M7 is connected to the input of the adder A4. The outputs of the adders A3, A4 are connected to accumulators ACC3, ACC4. The output of each accumulator ACC3, ACC4 is connected to one of the switches I3, I4. The switch I3 allows the output of the accumulator ACC3 to be directed at an input of the adder A3, or at the multiplier M3. Likewise, the switch I4 allows the output of the accumulator ACC4 to be directed at an input of the adder A4, or at the multiplier M4.

The control module CTL of the circuit PHD2 successively supplies the values of all the points Pk(ak,bk) of the constellation to the module CMB and the control signal of the switches I1, I2 is also applied to the switches I3 and I4 to reloop the output of the accumulators ACC1, ACC2, ACC3 and ACC4 onto the adders A1, A2, A3 and A4 as long as a new point Pk(ak, bk) is supplied to the module CMB, and to supply the values accumulated in the accumulators ACC1, ACC2, ACC3, ACC4 respectively to the inverter 1/x and the multipliers M2, M3, M4 when the Cartesian coordinates of all the points Pk(ak,bk) of the modulation constellation have been supplied to the module CMB. The output of the inverter 1/x is connected to an input of the multipliers M3 and M4 which output quantities B0 and B1. The quantities B0 and B1 allow the noise parameters $R^2$ and $2\sigma^2$ to be evaluated as follows:

$$R^2 = \langle B0 \rangle - \langle B1 \rangle \quad (20)$$

$$2\sigma^2 = \langle B1 \rangle \quad (21)$$

where $\langle \ \rangle$ is the averaging operator, $$B0 = \frac{\sum_{k=1}^{m} rk^2 LUT0[rk]}{\sum_{k=1}^{m} LUT0[rk]} \text{ and } B1 = \frac{\sum_{k=1}^{m} rk^2 LUT1[rk]}{\sum_{k=1}^{m} LUT0[rk]}.$$

In fact, it may be shown by a searching of a probability maximum of detecting a certain sequence of N received symbols, that the tables LUT0 and LUT1 may allow the amplitude R of the interference signal and the noise variance $\sigma^2$ to be evaluated using the following equations:

$$R^2 = \left\langle \frac{\sum_{k} rk^2 (LUT0[rk] - LUT1[rk])}{\sum_{k} LUT0[rk]} \right\rangle \quad (22)$$

$$2\sigma^2 = \left\langle \frac{\sum_{k} rk^2 \cdot LUT1[rk]}{\sum_{k} LUT0[rk]} \right\rangle \quad (23)$$

These equations have been obtained by calculating the derivatives of the probability function in relation to the amplitude R and the power $\sigma^{-2}$, and by searching the values of R and $\sigma^{-2}$ which cancel these derivatives.

The amplitude R of the interference signal and the noise variance $2\sigma^2$ may thus be reevaluated in a recursive way by calculating an average of the quantities B0 and B1 on a certain number of symbols. Each time the values $R^2$ and $2\sigma^2$ are evaluated, the values memorized in the tables LUT0 and LUT1 may be recalculated from these equations (17) and (18). The circuit PHD2 includes to that end a calculation circuit LTUD for calculating the values of the look-up tables LUT0 and LUT1. The circuit LTUD receives the values B0 and B1, calculates therefrom average values $\langle B0 \rangle$ and $\langle B1 \rangle$ for example on 200 to 1000 symbols, deduced therefrom evaluations of the variance $2\sigma^2$ and the amplitude square $R^2$, then calculates the values of the tables LUT0 and LUT1 and updates them.

The calculation of the variance $2\sigma^2$ and the amplitude square $R^2$, and the values of the tables LUT0 and LUT1 may thus be performed periodically, each time the number of received symbols is sufficient for the calculation of the average values $\langle B0 \rangle$ and $\langle B1 \rangle$. The initial values of $2\sigma^2$ and $R^2$ may be arbitrarily chosen, avoiding choosing R equal to 0 which is a trivial solution of the equations for determining R and $2\sigma^2$. In practice, the amplitude R and the power $2\sigma^2$ are initialized to typical values, i.e., R is set to a minimum value and $2\sigma^2$ is set a probable value. During the calculations, the amplitude R may be maintained at a value higher than $\sigma/8$ for example, to avoid reaching the value 0. Likewise, the power $2\sigma^2$ may be maintained in a range of probable values so as to simplify the approximations. After a small number of iterations, it may be noticed that the amplitude R and the power $2\sigma^2$ reach substantially optimal values. The circuit PHD2 is thus self-adaptive by being configured to automatically follow the evolution of the noise affecting the transmission of the received signal.

Figure 8:
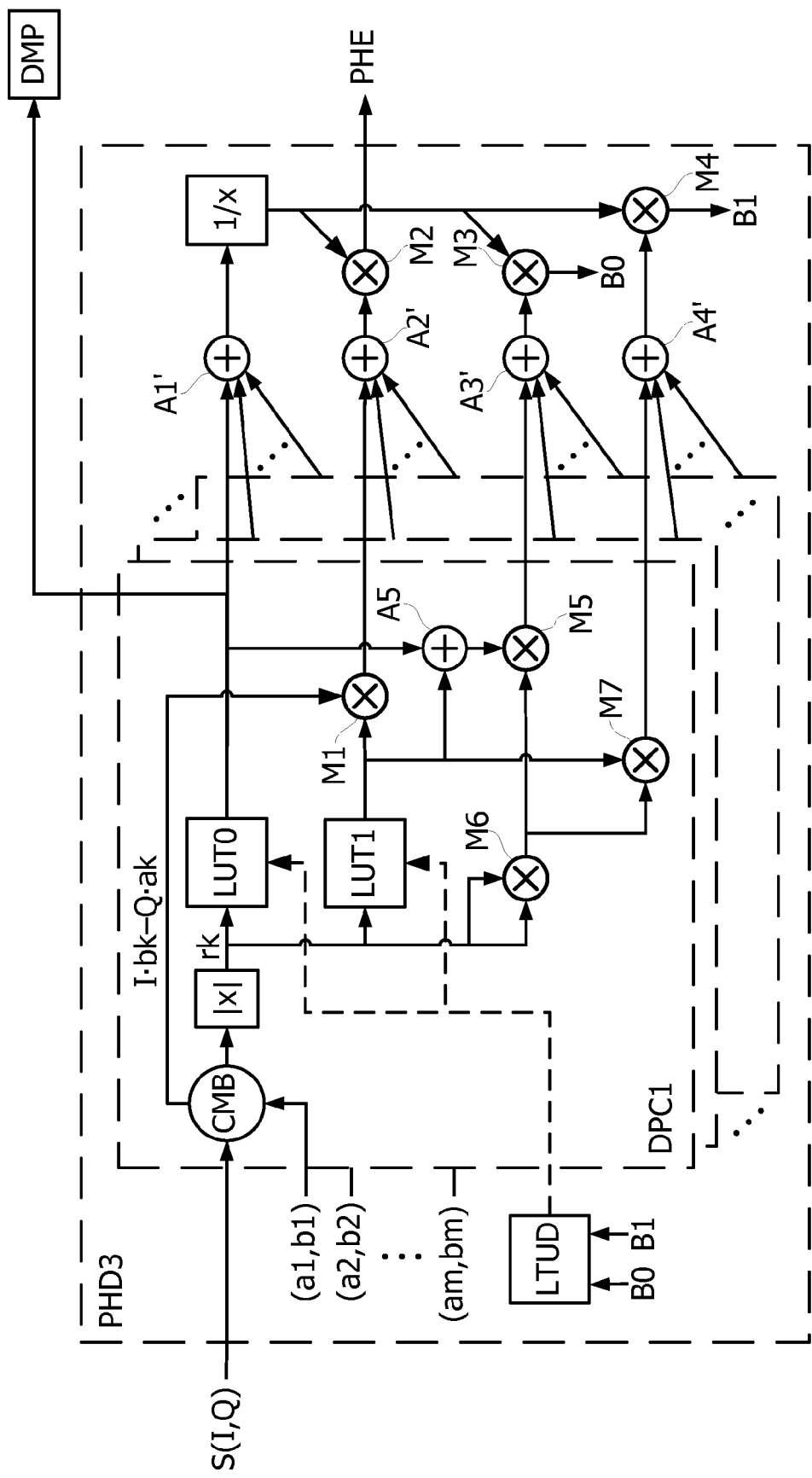

As for the circuit PHD, if the sums supplied by the accumulators ACC1 to ACC4 cannot be obtained in a time inferior to the duration of reception of a symbol S, the terms of these sums may be calculated in parallel as shown in FIG. 8. In FIG. 8, the elements already present in FIG. 6 bear the same reference signs. FIG. 8 shows a phase error evaluation circuit PHD3 including a calculation module DPC1 for each term of the four sums supplied by the accumulators ACC1 to ACC4, and four adders A1', A2', A3', A4'. The input of the module 1/x is connected to the output of the adder A1'. The output of the module 1/x is connected to an input of each multiplier M2, M3, M4. Another input of each multiplier M2, M3, M4 is connected to the output of one of the adders A2', A3', A4'. The outputs of the multipliers M3 and M4 respectively supply the quantities B0 and B1.

Calculating the values of the tables LUT0 and LUT1 may be performed using simple calculation means, such as software or computer-implemented tools, which may use floating point operations with a relatively small mantissa (for example from 8 to 10 bits). In fact, from the values of $R^2$ and $\sigma^2$ obtained from the quantities $\langle B0 \rangle$ and $\langle B1 \rangle$, the values of R and $1/\sigma^2$ may be evaluated using small look-up tables (64 to 256 values are sufficient). Then the values $R/\sigma^2$ and $R^2/\sigma^2$ may be calculated, which allows the quantity $u=r \cdot R/\sigma^2$ to be calculated for r varying from 0 to 100 for example. For the low values of u, $I0(u)$ and $T(u)$ may be approximated using a Taylor expansion of these functions in u. For the high values of u, the function I0 may be approximated by a function equal to $\exp(u)/\sqrt{2\pi u}$, the difference being expanded in negative power of u. The exponential function $\exp(\ )$ is calculated using the equation $\exp(x)=2^{x/\ln 2}$, by performing a previous multiplication of the variable x by $1/\ln 2$. The integer part of $x/\ln 2$ thus gives the exponent, while a table with 256 inputs for example, addressed by the fractional part of this number gives the mantissa.

Thus, the following approximations may for example be applied:

if $u < 7/4$ (low values of u) then $$LUT0[r]=(1+c1a \cdot u^2+c2a \cdot u^4)\cdot \exp[-(R^2+r^2)/(2\sigma^2)]$$

$$LUT1[r]=1/\sigma^2 \cdot [1-R^2/(2\sigma^2) \cdot (1+c1c \cdot u^2+c2c \cdot u^4)] \cdot LUT0[r]$$

or (low values of 1/u)

$$LUT0[r]=(1+c1b/u+c2b/u^2)/\sqrt{u} \cdot \exp[-(R^2-r^2)/(2\sigma^2)]-0.5 \cdot \ln(2\pi)$$

$$LUT1[r]=1/\sigma^2 \cdot [1-R^2)/(2\sigma^2) \cdot (1/u+c1d/u^2+c2d \cdot u^3)] \cdot LUT0[r]$$

If the calculations are performed with a mantissa on 10 bits, the coefficients used in the calculation of the tables LUT0 and LUT1 have the following values:

| | |
|---|---|
| c1a = 256/1024 | c1c = −128/1024 |
| c2a = 17/1024 | c2c = 14/1024 |
| c1b = 125/1024 | c1d = −512/1024 |
| c2b = 112/1024 | c2d = −204/1024 |

It is to be noted that the algorithm on which the operation of the phase error evaluation circuit is based does not depend on the constellation, i.e., the type of digital modulation of the signal to be processed. The result is that this circuit is adapted to process all the signals complying with the DVB-S2 standard, as they are susceptible of being modulated by different types of digital modulation (QPSK, 8-PSK, 16-APSK or 32-APSK). In fact, the only adaptation to be performed concerns the number and coordinates of the points Pk(ak, bk) of the modulation constellation. Except for the definition of the constellation, this algorithm does not imply other parameters linked to the modulation or modeling of the noise. This algorithm reveals to be optimum in the case where the noise to which the signal to be processed is subjected only includes one Gaussian noise component and one interference noise component with a constant amplitude R. This algorithm also reveals to be robust by accepting relatively low carrier-to-noise plus interference ratio values. This algorithm also has the advantage of offering a good precision (around 0.1 dB) in the evaluation of a symbol, and of using relatively few calculation means and storing means (around one hundred values in each table LUT0 and LUT1 in the case of the DVB-S2 standard).

In addition, in the demodulator DMP, the demodulated symbols are generally processed by an error correction device like a device of convolutional code type associated to a Viterbi decoder, a turbo code or low-density parity-check code LDPC device. Such an error correction device may be based on a calculation of log likelihood ratio LLR. The log likelihood ratio of the value of a bit b(i) of a received symbol LLR[b(i)] may be defined as follows:

$$LLR[b(i)] = \ln(Pr(b(i)=1)) - \ln(Pr(b(i)=0)) \quad (24)$$

where $Pr(b(i)=1)$ is the probability that the bit b(i) is equal to 1 and $Pr(b(i)=0)$ is the probability that the bit b(i) is equal to 0. The function LLR may be approximated assuming for example that the transmission has been subjected to the most unfavorable Gaussian noise. If the noise which has affected the transmission is not Gaussian, then the correction is sub optimal.

Now the probability calculations on the value of the symbols have been performed in the previously described phase error evaluation circuits PHD, PHD1, PHD2, PD3. It must therefore only add in the error correction device of the module DMP a circuit for evaluating the probabilities Pr(b(i)=1) and Pr(b(i)=0) which only includes accumulators using the table LUT0, a Napierian logarithm calculation and a subtraction. To that end, the output of the table LUT0 in the phase error evaluation circuit PH2, PH3, may be linked to the module DMP, as shown in FIGS. 7 and 8, and a small look-up table may be provided for the logarithm calculation.

It will be clear to those skilled in the art that the present disclosure is susceptible of various embodiments and applications. In particular, the disclosure is not limited to the implementation of the previously described equations. In fact, other equations may be developed from the noise modeling used. In addition, the content of the tables LUT0 and LUT1 in the equation (10) may be obtained in various ways, and not necessarily using the equations (17) and (18). In fact, the tables LUT and LUT1 may for example be filled in or reevaluated after learning periods during which symbols of known values are transmitted.

In addition, the different phase error evaluation calculations may be performed in wired-logic like in the circuits shown in FIGS. 4 to 8 or by a processor rapid enough to supply a phase error evaluation in real time, i.e., at the rate of symbol reception. The other calculations for updating the tables LUT0 and LUT1 may also be performed by a processor, knowing that the calculation time available is longer, the noise parameters $\sigma^2$ and R may be evaluated on a sequence of several hundreds of symbols, for example 200 to 1000 symbols.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving a signal having a succession of symbols transmitted by a digital modulation, each symbol having an amplitude and a phase belonging to a set of values in finite number;
evaluating a phase error, of a received symbol in the received signal, resulting from a signal transmission noise by modeling the transmission noise with a Gaussian component not correlated with the received signal, the Gaussian component defined entirely by a power, $2\sigma^2$, and an interference component defined by an amplitude, and having a phase that is substantially uniformly distributed, the evaluating including evaluating the phase error of the received symbol based on the power of the Gaussian component and the amplitude of the interference component;
correcting the phase of the received symbol according to the evaluated phase error; and
demodulating the phase corrected symbol.

2. The method according to claim 1, wherein the evaluating includes evaluating average values of the power of the Gaussian component and the amplitude of the interference component of the noise on a plurality of received symbols.

3. The method according to claim 1 wherein evaluating the phase error of the received symbol includes evaluating the received symbol by a maximum likelihood calculation algorithm based on a phase derivative calculation of a sum of logarithms of probabilities that the phase of the received symbol is equal to each of the values of the finite set of phases of the modulation.

4. The method according to claim 1 wherein evaluating the phase error of the received symbol includes using the following equation:

$$PHE(S) = \frac{\sum_{i=1}^{m} (I \cdot bk - Q \cdot ak) \cdot LUT1[rk]}{\sum_{i=1}^{m} LUT0[rk]}$$

where I and Q are real and imaginary parts of the received symbols, ak and bk are real and imaginary parts of a point of a modulation constellation that includes m points, rk is a distance in a complex plane between a position of the received symbol and the point of the constellation, and LUT0[rk] and LUT1[rk] are look-up tables, the table LUT0[rk] including values approximating a function of probability that a value of distance rk is equal to the distance between the position of the received symbol and the point of the constellation, in the direction of a straight line passing by the position of the symbol S and the point, and the table LUT[rk] includes values approximating a derived function of a probability function approximated by the table LUT0[rk] divided by the distance r, to a proportionality factor.

5. The method according to claim 4, wherein evaluating the power of the Gaussian component and the amplitude of the interference component of the noise includes evaluating a sequence of received symbols, and evaluating values in the look-up tables (LUT0, LUT1) includes evaluating according to the evaluated power of the Gaussian component and amplitude of the interference component of the noise.

6. The method according to claim 4 wherein evaluating the values of the look-up tables LUT0[$r$] and LUT1[$r$] includes evaluating to a proportionality factor using the following equations:

$$LUT0[r] = I0(u) \cdot \exp(v) \text{ and}$$

$$LUT1[r] = \frac{1}{\sigma^2}\left[1 - \frac{R^2}{2\sigma^2} \cdot T(u)\right] \cdot LUT0[r]$$

where $$u = \frac{r \cdot R}{\sigma^2}, v = -\frac{r^2 + R^2}{2\sigma^2},$$

$I0(u)$ is a modified first order Bessel function, $2\sigma^2$ is the power of the Gaussian component of the noise, $$T(u) = \frac{2}{u} \cdot \frac{I1(u)}{I0(u)}$$

and $I1(u)$ is a derived function in relation to u of the function $I0(u)$.

7. The method according to claim 6, wherein evaluating the power of the Gaussian component $2\sigma^2$ and the amplitude R of the interference component of the noise includes using the following equations:

$$R^2 = \langle B0 \rangle - \langle B1 \rangle \text{ and } 2\sigma^2 = \langle B1 \rangle$$

where $\langle \ \rangle$ is the averaging operator on a sequence of received symbols and B0 and B1 are output quantities, and $$B0 = \frac{\sum_{k=1}^{m} rk^2 LUT0[rk]}{\sum_{k=1}^{m} LUT0[rk]} \text{ and } B1 = \frac{\sum_{k=1}^{m} rk^2 LUT1[rk]}{\sum_{k=1}^{m} LUT0[rk]}.$$

8. The method according to claim 1, further comprising:
demodulating each received symbol to obtain a value;
correcting the value of the received symbol by using a look-up table to evaluate a phase error on each received symbol; the look-up table having values approximating a function of probability that a value is equal to a distance between a position of the received symbol and a point of a modulation constellation.

9. A device, comprising:
an input module configured to receive a signal having a succession of symbols transmitted by a digital modulation, each symbol having a phase and amplitude having a set of values in finite number;
a phase error evaluation circuit coupled to the input module and configured to:
receive the signal having the succession of symbols;
evaluate a phase error of a received symbol in the succession of symbols resulting from a signal transmission noise by modeling a transmission noise with a Gaussian component not correlated with the received signal, the Gaussian component defined entirely by a power, $2\sigma^2$, and an interference component defined by an amplitude, having and a phase that is substantially uniformly distributed, the phase error evaluation circuit being configured to evaluate the phase error of the received symbol based on the power of the Gaussian component and the amplitude of the interference component;
correct the phase of the received symbol according to the evaluated phase error;
demodulate the phase corrected symbol.

10. The device according to claim 9 wherein the phase error evaluation circuit includes:
a first look-up table configured to store values approximating a function of probability that a distance value is equal to a distance between a position of the received symbol and a point of a constellation of the digital phase modulation; and
a second look-up table configured to store values approximating the derived probability function approximated by the first look-up table.

11. The device according to claim 10 wherein the phase error evaluation circuit includes:
a first sum calculation circuit configured to calculate a first sum of values read in the first look-up table and a second sum of values read in the second look-up table weighted by a weight factor, the values read in the look-up tables obtained according to distances between the position of the received symbol and each point of a constellation of the digital phase modulation; and
a phase error calculation circuit configured to calculate a phase error obtained by dividing the second weighted sum by the first sum.

12. The device according to claim 10 wherein the phase error evaluation circuit includes:
a calculation circuit for each point of a constellation of the digital phase modulation, each calculation circuit configured to determine a value read in the first look-up table and a value read from the second look-up table according to a distance between the position of the received symbol and the point of the constellation of the digital phase modulation, and to multiply the value read from the second look-up table by a weight factor depending on values of the received symbol and the point of the constellation;
a first adder configured to calculate the sum of the values read in the first look-up table; and
a second adder structured to calculate the weighted sum of the values read in the second look-up table.

13. The device according to claim 10 wherein the phase error evaluation circuit includes:
a circuit configured to calculate two quantities using the values read in the look-up tables; and
a circuit configured to calculate average values of the two quantities on a sequence of received symbols, evaluate the power of the Gaussian component and the amplitude of the interference component, and calculate and update the values of the look-up tables.

14. The device according to claim 10, comprising a demodulator configured to demodulate the symbols corrected in phase from the phase error evaluated by the phase error evaluation circuit, the demodulator configured to receive the values read in the first look-up table to correct the value of the demodulated symbols.

15. A circuit, comprising:
a receiver configured to receive a transmitted signal having a succession of symbols, transmitted by digital modulation, each symbol transmitted having an amplitude and a phase belonging to a set of values in finite number, the reception device including:
a phase error evaluation circuit configured to:
receive the transmitted signal; and
evaluate a phase error of a received symbol resulting from a signal transmission noise by modeling the transmission noise with a Gaussian component not correlated with the received signal, the Gaussian component having a power and an interference component defined by an amplitude and a phase that is substantially uniformly distributed, the phase error evaluation circuit configured to evaluate the phase error of the received symbol on the basis of the power of the Gaussian component and the amplitude of the interference component using the following equation:

$$PHE(S) = \frac{\sum_{i=1}^{m}(I \cdot bk - Q \cdot ak) \cdot LUT1[rk]}{\sum_{i=1}^{m} LUT0[rk]}$$

where I and Q are real and imaginary parts of the received symbol, ak and bk are real and imaginary parts of a point of the modulation constellation comprising m points, rk is a distance in a complex plane between a position of the received symbol and the point of the constellation, and LUT0[rk] and LUT1[rk] are look-up tables, the table LUT0[rk] comprising values approximating a function of probability that a value of distance rk is equal to a distance between the position of the received symbol and the point of the constellation, in a direction of a straight line passing by the position of the received symbol and the point, and the table LUT[rk] including values approximating the derived function of the probability function approximated by the table LUT0[rk], divided by the distance r, to a proportionality factor;
correct the phase of the received symbol according to the phase error evaluated; and
demodulate the symbol corrected in phase.

16. The circuit of claim 15, wherein the phase error evaluation circuit is configured to evaluate average values of the power of the Gaussian component and the amplitude of the interference component of the noise on a certain number of received symbols.

17. A circuit, comprising:
a phase error evaluation circuit adapted to receive transmitted digitally modulated symbols having amplitude and phase belonging to a set of values in finite number, the phase error evaluation circuit including:
first and second accumulators, first and second adders, and first and second switches, the first accumulator coupled to the first adder and the first switch, the second accumulator coupled to the second adder and the second switch; and
first and second look-up tables coupled to the first and second adders, respectively, the first and second adders configured to calculate a first sum of values read from the first look-up table and a second sum of values read from the second look-up table weighted by a weight factor;
a calculation circuit for each point of a constellation of a digital phase modulation of the received symbol, each calculation circuit configured to determine a value read from the first look-up table and a value read from the second look-up table according to a distance between the position of the received symbol and the point of the constellation of the digital phase modulation, and to multiply the value read in the second look-up table by the weight factor; and
a circuit adapted to calculate two quantities using the values read from the first and second look-up tables and an average value calculation circuit to calculate average values of the two quantities on a sequence of a plurality of received signals and to evaluate a power of a Gaussian component and amplitude of an interference component, and to calculate and update the values of the first and second look-up tables.

18. The circuit of claim 17, comprising a demodulator to demodulate the received symbols corrected in phase from the phase error evaluation circuit, the demodulator receiving the values read in the first look-up table and to correct the value of the demodulated symbols.

19. The circuit of claim 18 wherein the phase error evaluation circuit is adapted to model transmission noise of the received symbols by a Gaussian component not correlated with the received symbols, defined by a power and an interference component having an amplitude and a phase that is substantially uniformly distributed, the phase error of the received symbols evaluated on the basis of the power of the Gaussian component and on the basis of the amplitude of the interference component.

20. A method, comprising:
receiving a signal having a succession of symbols transmitted by a digital modulation, each symbol having an amplitude and a phase belonging to a set of values in finite number;
evaluating a phase error, of a received symbol in the received signal, resulting from a signal transmission noise by modeling the transmission noise with a Gaussian component not correlated with the received signal, the Gaussian component having a power and an interference component that includes an amplitude and a phase that is substantially uniformly distributed, the evaluating including:
evaluating the phase error of the received symbol based on the power of the Gaussian component and the amplitude of the interference component, including evaluating the received symbol by a maximum likelihood calculation algorithm based on a phase derivative calculation of a sum of logarithms of probabilities that the phase of the received symbol is equal to each of the values of the finite set of phases of the modulation;
correcting the phase of the received symbol according to the evaluated phase error; and
demodulating the phase corrected symbol.

21. The method of claim 20, further comprising:
demodulating each received symbol to obtain a value; and correcting the value of the received symbol by using a look-up table to evaluate a phase error on each received symbol; the look-up table having values approximating a function of probability that a value is equal to a distance between a position of the received symbol and a point of a modulation constellation.

22. A method, comprising:
receiving a signal having a succession of symbols transmitted by a digital modulation, each symbol having an amplitude and a phase belonging to a set of values in finite number;
evaluating a phase error of a received symbol in the received signal resulting from a signal transmission noise by modeling the transmission noise with a Gaussian component not correlated with the received signal, the Gaussian component having a power and an interference component that includes an amplitude and a phase that is substantially uniformly distributed, the evaluating including:
evaluating the phase error of the received symbol based on the power of the Gaussian component and the amplitude of the interference component, including using the following equation:

$$PHE(S) = \frac{\sum_{i=1}^{m}(I \cdot bk - Q \cdot ak) \cdot LUT1[rk]}{\sum_{i=1}^{m} LUT0[rk]}$$

where I and Q are real and imaginary parts of the received symbols, ak and bk are real and imaginary parts of a point of a modulation constellation that includes m points, rk is a distance in a complex plane between a position of the received symbol and the point of the constellation, and LUT0[rk] and LUT1[rk] are look-up tables, the table LUT0[rk] including values approximating a function of probability that a value of distance rk is equal to the distance between the position of the received symbol and the point of the constellation, in the direction of a straight line passing by the position of the symbol S and the point, and the table LUT[rk] includes values approximating a derived function of a probability function approximated by the table LUT0[rk] divided by the distance r, to a proportionality factor;
correcting the phase of the received symbol according to the evaluated phase error; and
demodulating the phase corrected symbol.

23. The method according to claim 22, wherein evaluating the power of the Gaussian component and the amplitude of the interference component of the noise includes evaluating a sequence of received symbols, and evaluating values in the look-up tables (LUT0, LUT1) includes evaluating according to the evaluated power of the Gaussian component and amplitude of the interference component of the noise.

24. The method according to claim 22 wherein evaluating the values of the look-up tables LUT0[$r$] and LUT1[$r$] includes evaluating to a proportionality factor using the following equations:

$$LUT0[r] = I0(u) \cdot \exp(v) \text{ and } LUT1[r] = \frac{1}{\sigma^2}\left[1 - \frac{R^2}{2\sigma^2} \cdot T(u)\right] \cdot LUT0[r]$$

where $$u = \frac{r \cdot R}{\sigma^2}, v = -\frac{r^2 + R^2}{2\sigma^2},$$

I0($u$) is a modified first order Bessel function, $2\sigma^2$ is the power of the Gaussian component of the noise, $$T(u) = \frac{2}{u} \cdot \frac{I1(u)}{I0(u)}$$

and I1($u$) is a derived function in relation to u of the function I0($u$).

25. The method according to claim 22, wherein evaluating the power of the Gaussian component $2\sigma^2$ and the amplitude R of the interference component of the noise includes using the following equations:

$$R^2 = \langle B0 \rangle - \langle B1 \rangle \text{ and } 2\sigma^2 = \langle B1 \rangle$$

where $\langle \ \rangle$ is the averaging operator on a sequence of received symbols and B0 and B1 are output quantities, and $$B0 = \frac{\sum_{k=1}^{m} rk^2 LUT0[rk]}{\sum_{k=1}^{m} LUT0[rk]} \text{ and } B1 = \frac{\sum_{k=1}^{m} rk^2 LUT1[rk]}{\sum_{k=1}^{m} LUT0[rk]}.$$

26. The method according to claim 22, further comprising:
demodulating each received symbol to obtain a value;
correcting the value of the received symbol by using a look-up table to evaluate a phase error on each received symbol; the look-up table having values approximating a function of probability that a value is equal to a distance between a position of the received symbol and a point of a modulation constellation.

27. A device, comprising:
an input module configured to receive a signal having a succession of symbols transmitted by a digital modulation, each symbol having a phase and amplitude having to a set of values in finite number;
a phase error evaluation circuit coupled to the input module and configured to:
receive the signal having the succession of symbols;
evaluate a phase error of a received symbol in the succession of symbols resulting from a signal transmission noise by modeling a transmission noise with a Gaussian component not correlated with the received signal, the Gaussian component having a power and an interference component defined by an amplitude and a phase that is substantially uniformly distributed, the phase error evaluation circuit being configured to evaluate the phase error of the received symbol based on the power of the Gaussian component and the amplitude of the interference component;
correct the phase of the received symbol according to the evaluated phase error; and
demodulate the phase corrected symbol;
a first look-up table configured to store values approximating a function of probability that a distance value is equal to a distance between a position of the received symbol and a point of a constellation of the digital phase modulation; and a second look-up table configured to store values approximating the derived probability function approximated by the first look-up table.

28. The device according to claim 27 wherein the phase error evaluation circuit includes:
   a first sum calculation circuit configured to calculate a first sum of values read in the first look-up table and a second sum of values read in the second look-up table weighted by a weight factor, the values read in the look-up tables obtained according to distances between the position of the received symbol and each point of a constellation of the digital phase modulation; and
   a phase error calculation circuit configured to calculate a phase error obtained by dividing the second weighted sum by the first sum.

29. The device according to claim 27 wherein the phase error evaluation circuit includes:
   a calculation circuit for each point of a constellation of the digital phase modulation, each calculation circuit configured to determine a value read in the first look-up table and a value read from the second look-up table according to a distance between the position of the received symbol and the point of the constellation of the digital phase modulation, and to multiply the value read from the second look-up table by a weight factor depending on values of the received symbol and the point of the constellation;
   a first adder configured to calculate the sum of the values read in the first look-up table; and
   a second adder structured to calculate the weighted sum of the values read in the second look-up table.

30. The device according to claim 27 wherein the phase error evaluation circuit includes:
   a circuit configured to calculate two quantities using the values read in the look-up tables; and
   a circuit configured to calculate average values of the two quantities on a sequence of received symbols, evaluate the power of the Gaussian component and the amplitude of the interference component, and calculate and update the values of the look-up tables.

31. The device according to claim 27, comprising a demodulator configured to demodulate the symbols corrected in phase from the phase error evaluated by the phase error evaluation circuit, the demodulator configured to receive the values read in the first look-up table to correct the value of the demodulated symbols.

* * * * *